Fig-5

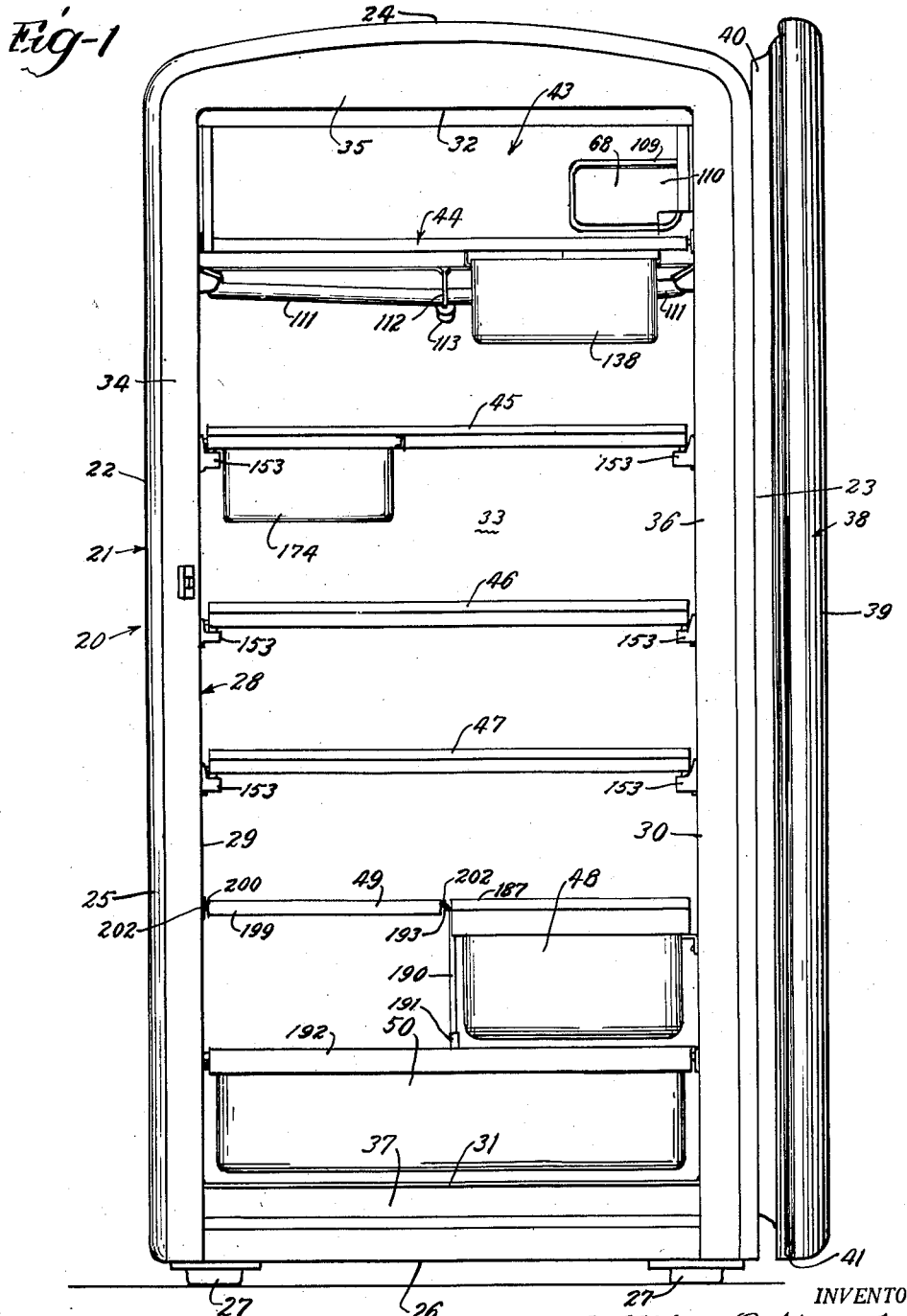

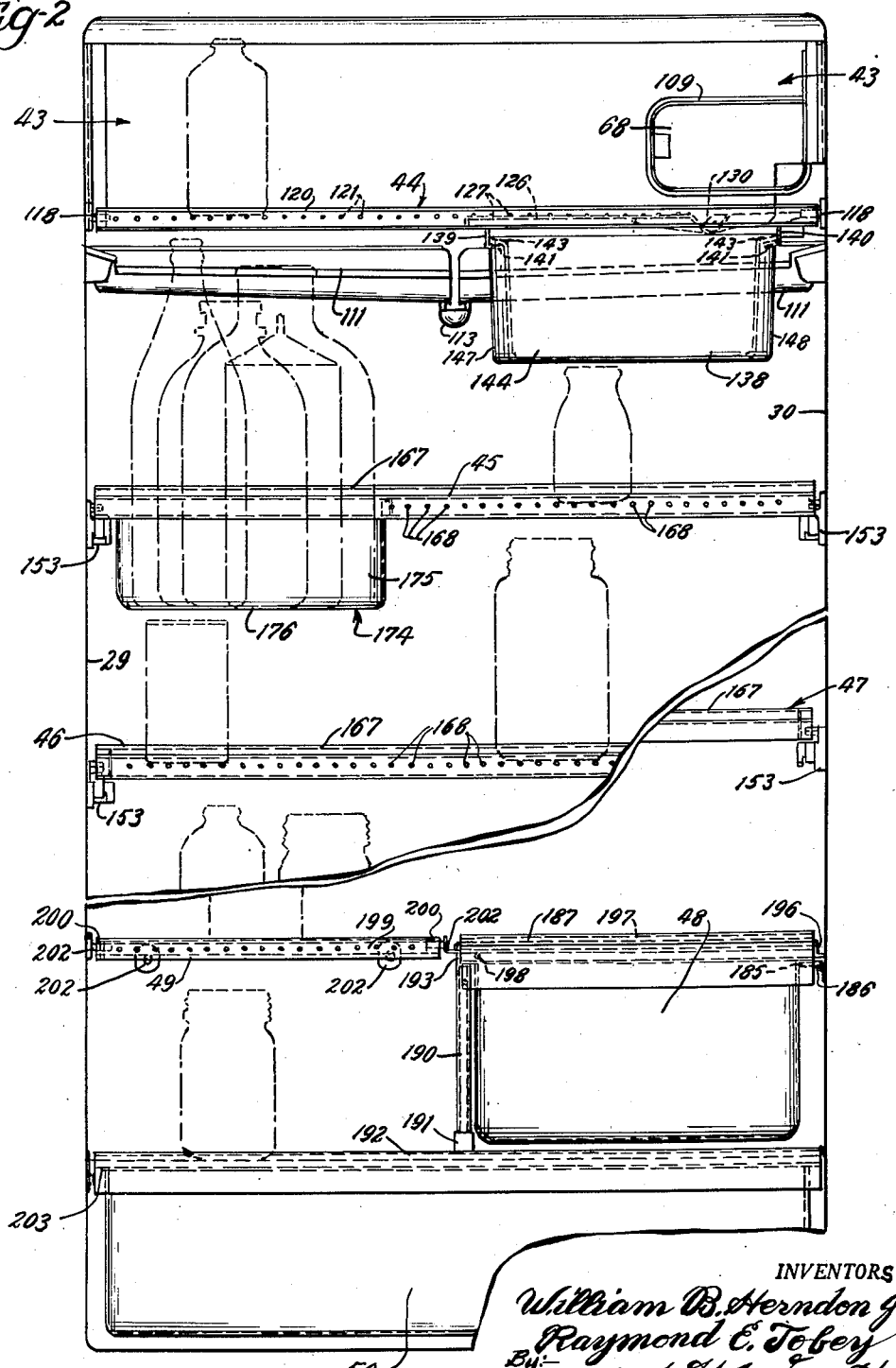

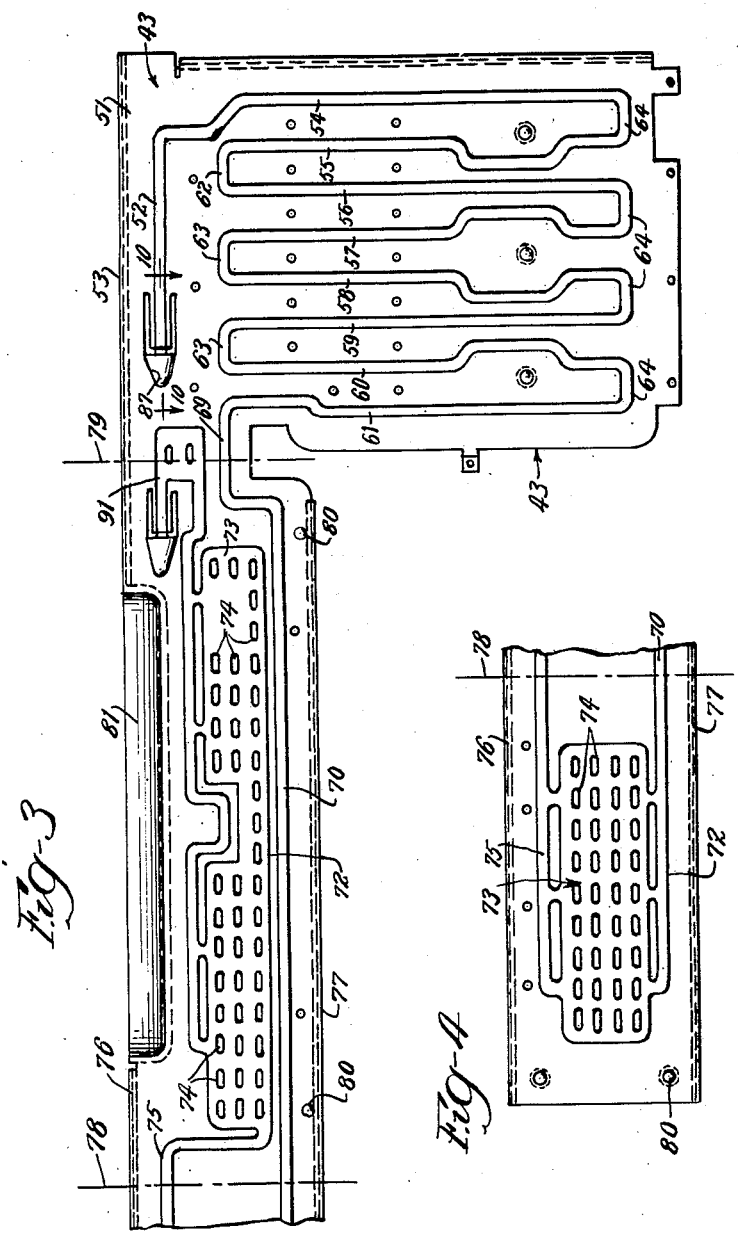

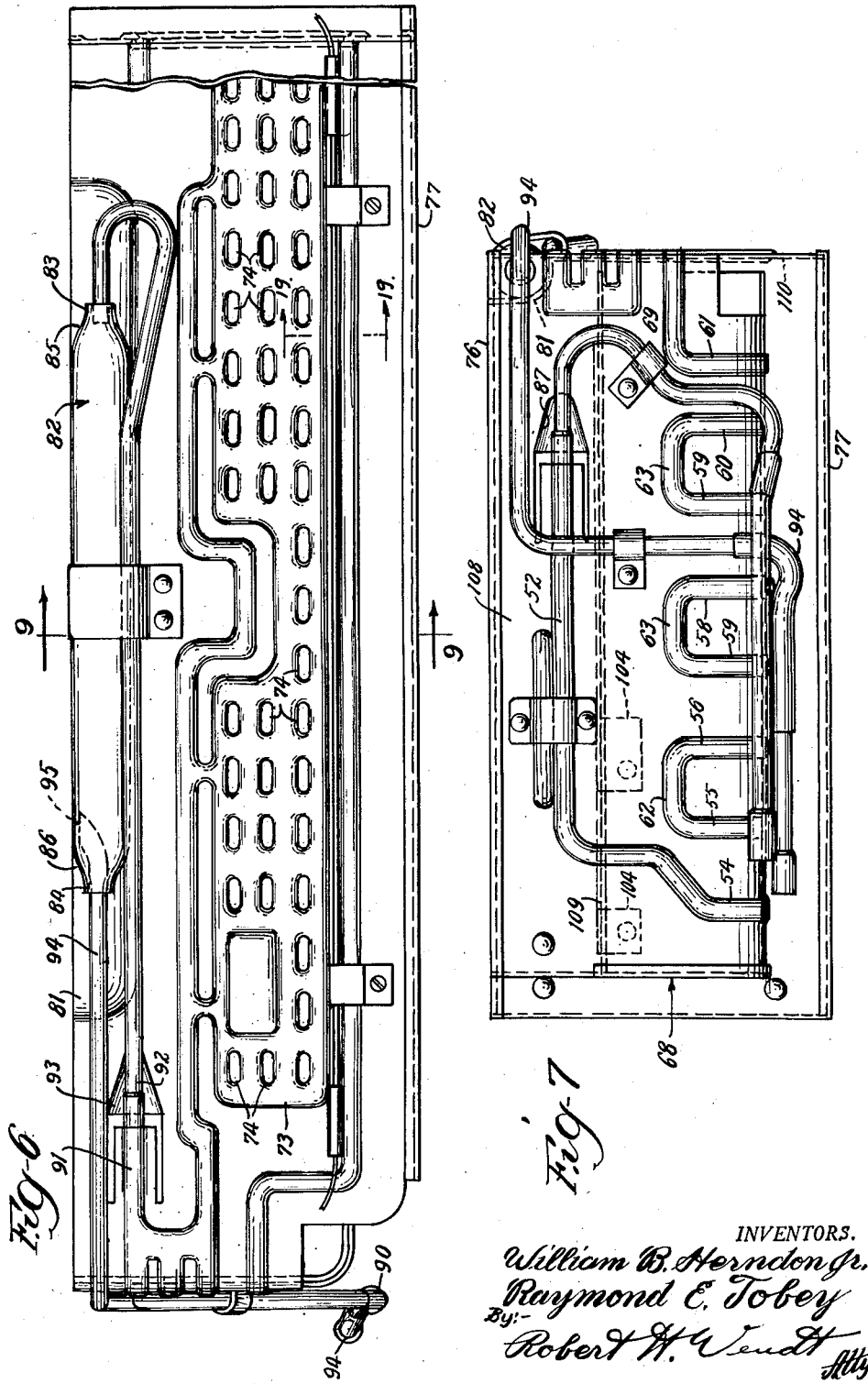

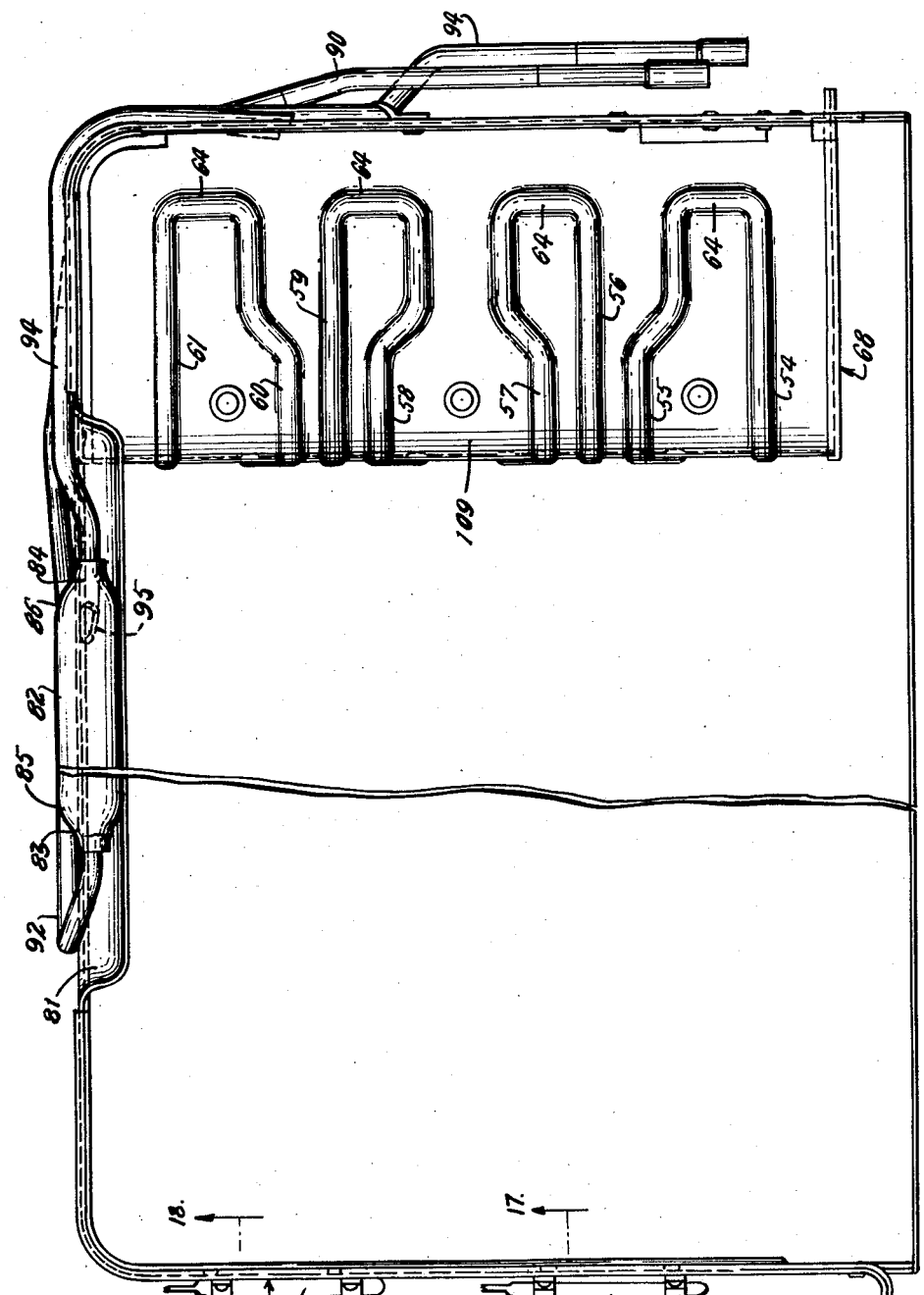

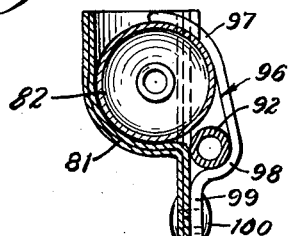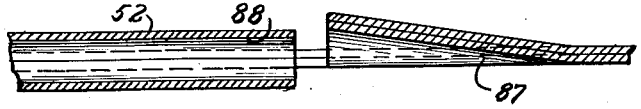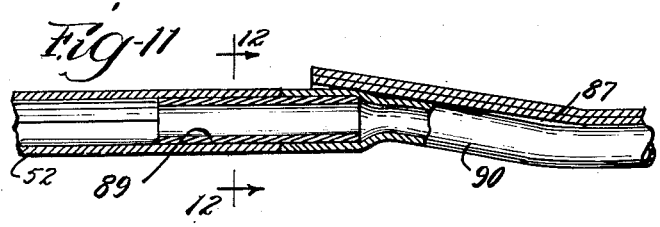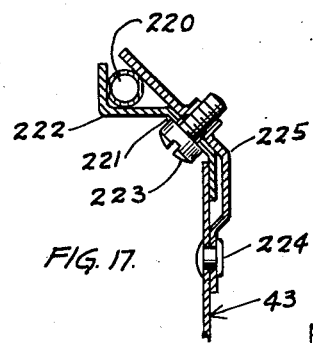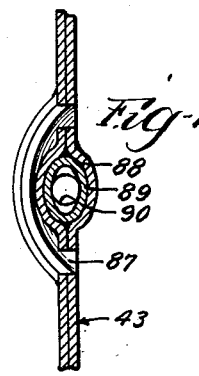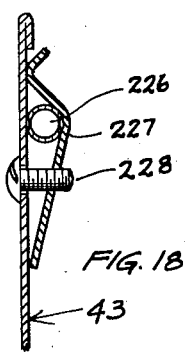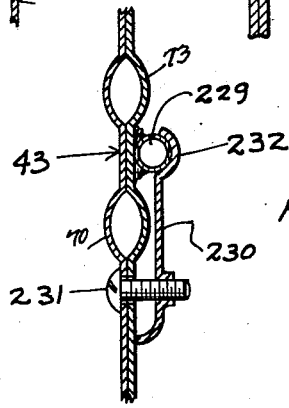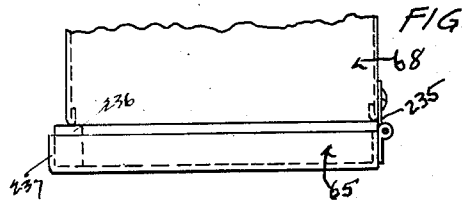

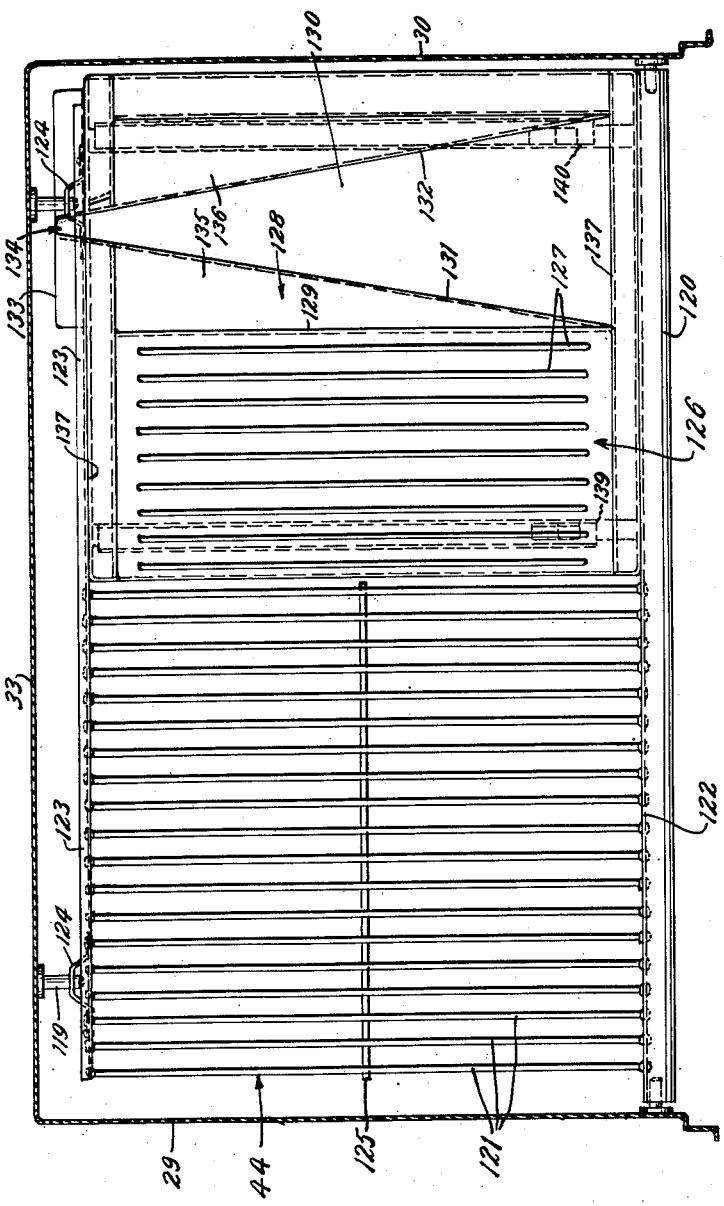

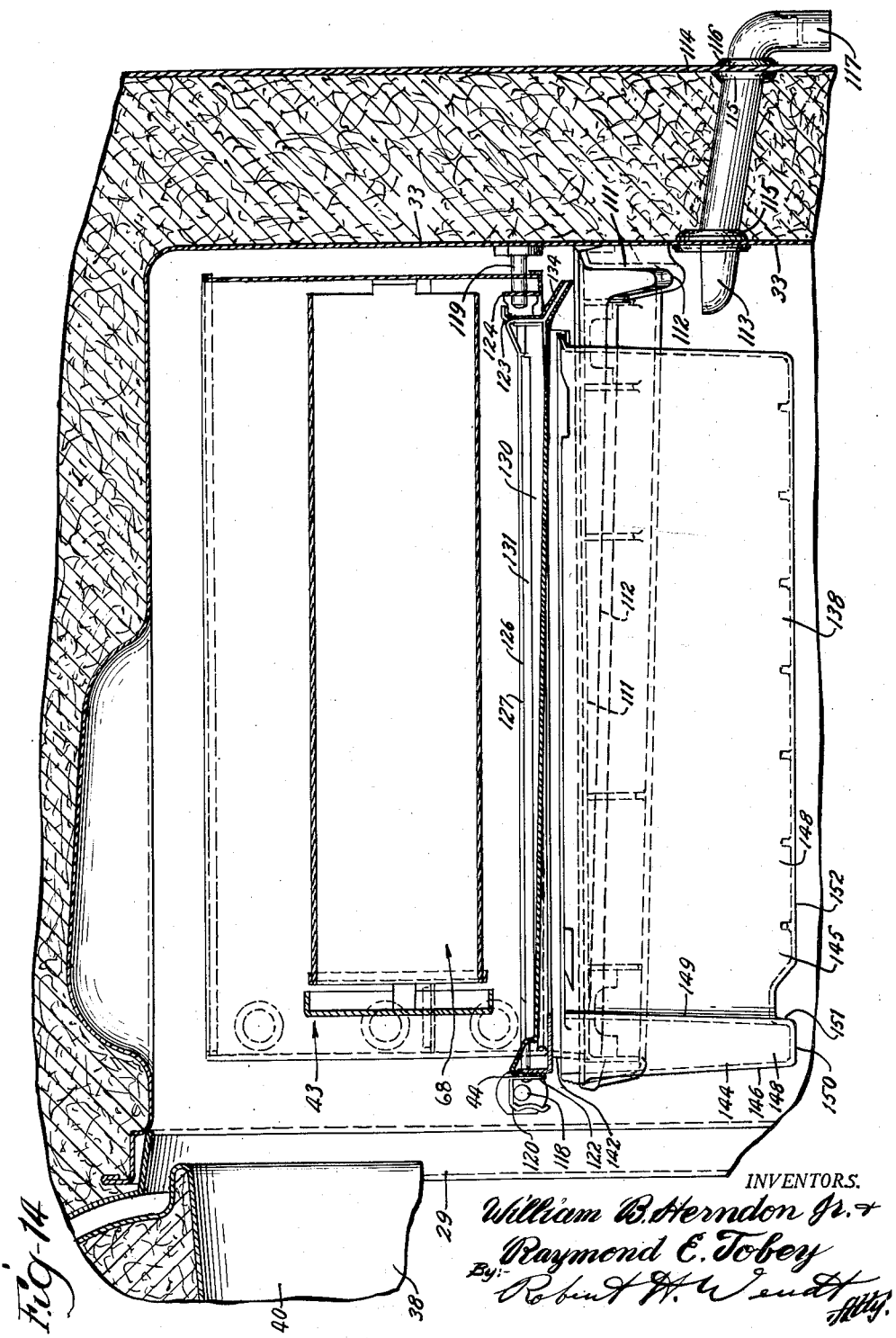

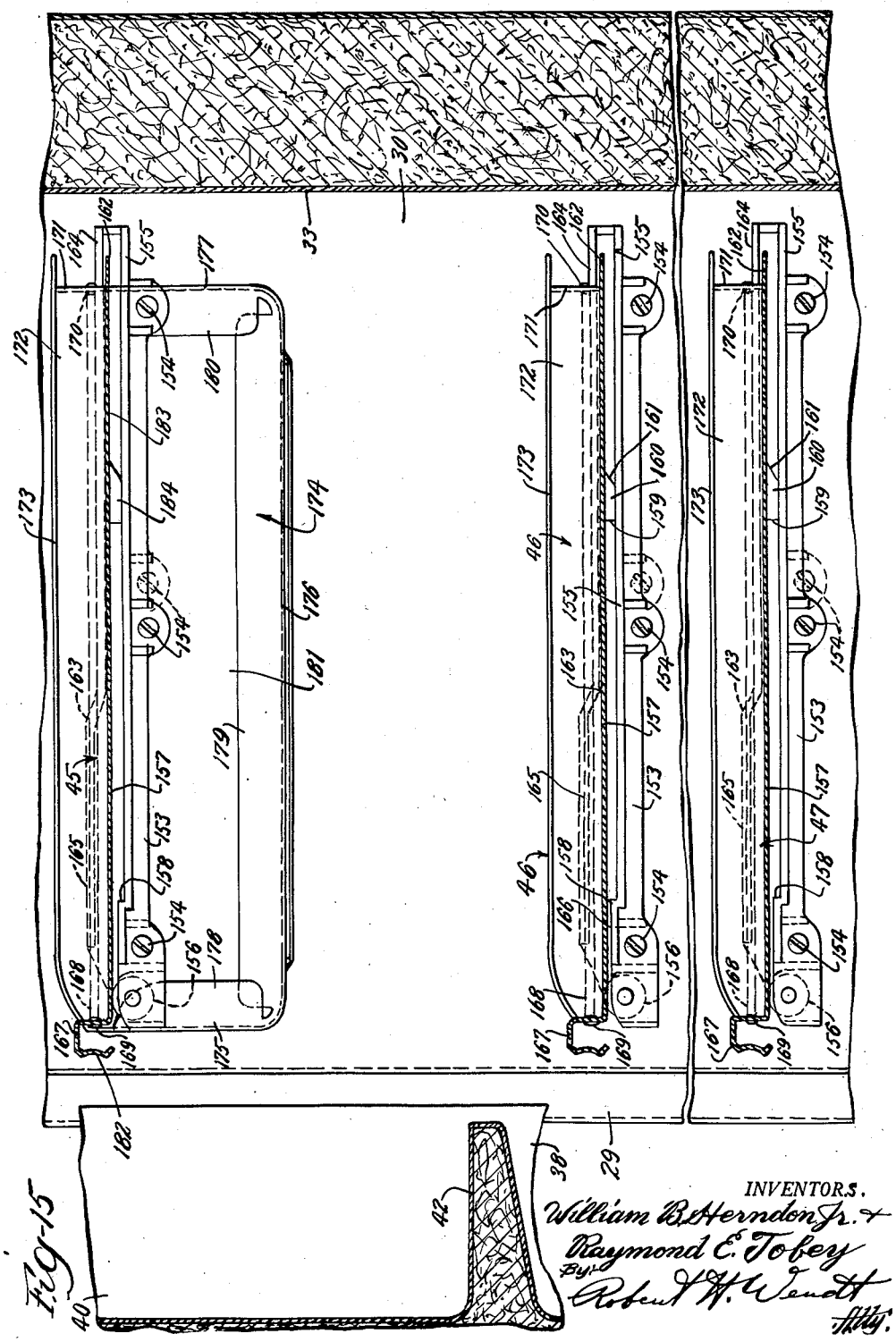

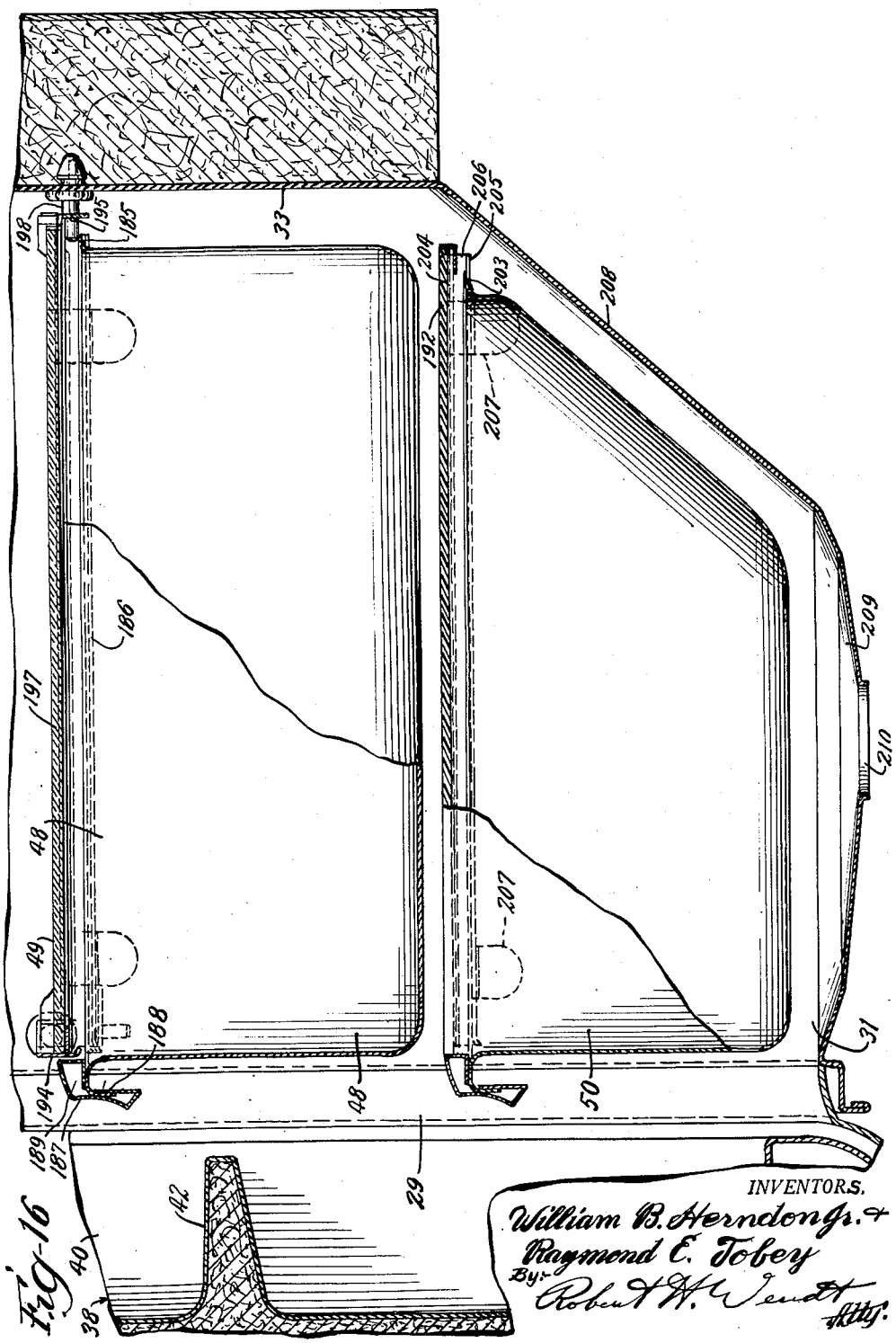

June 11, 1957   W. B. HERNDON, JR., ET AL   2,795,117
HOUSEHOLD REFRIGERATORS
Filed May 2, 1956   12 Sheets-Sheet 12
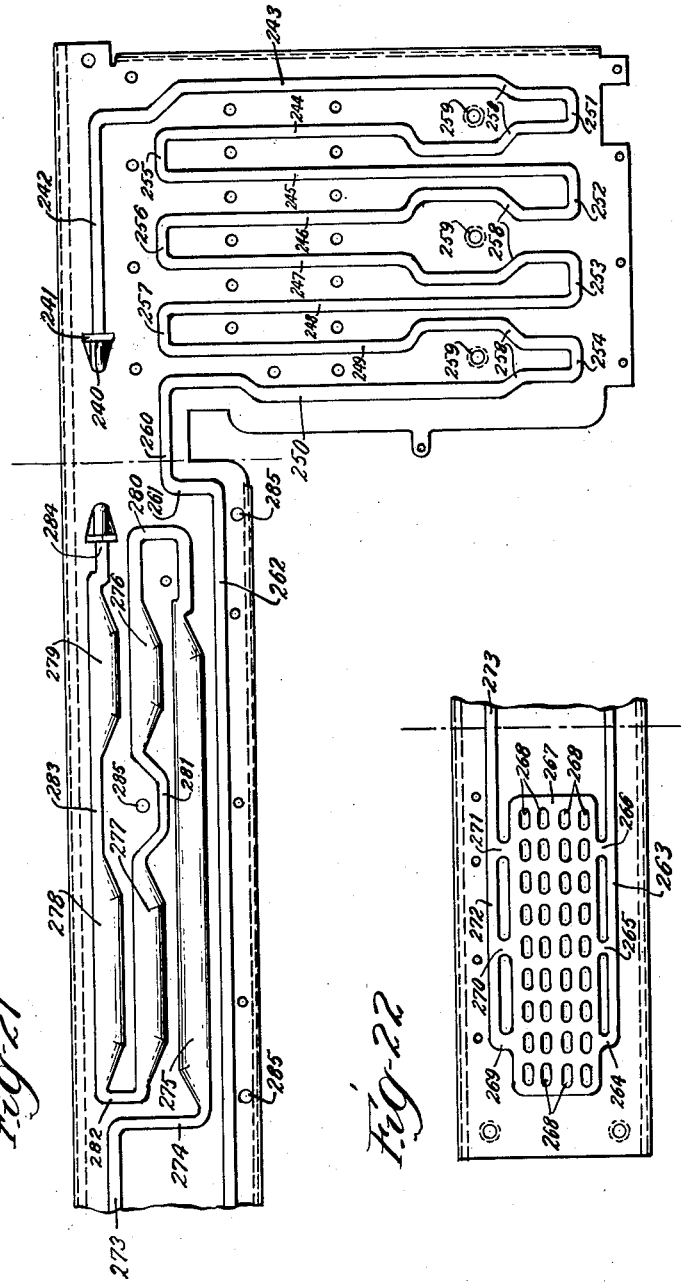
INVENTORS.
William B. Herndon Jr. &
Raymond E. Tobey
By: Robert W. Wendt
Atty.

United States Patent Office
2,795,117
Patented June 11, 1957

2,795,117

HOUSEHOLD REFRIGERATORS

William B. Herndon, Jr., and Raymond E. Tobey, Evansville, Ind., assignors to Whirlpool-Seeger Corporation, Evansville, Ind., a corporation of Delaware Application May 2, 1956, Serial No. 582,232

14 Claims. (Cl. 62—103)

The present invention relates to household refrigerators, and is particularly concerned with household refrigerators having a maximum amount of storage space for above freezing storage of food products, while still providing a freezing compartment for ice cubes and other frozen foods.

One of the objects of the invention is the provision of an improved household refrigerator which is adapted to provide a maximum space for storage of food products at above freezing temperatures, and which is adapted to be cooled by a single evaporator having an adequate space for ice cubes, and arranged to be defrosted automatically.

Another object of the invention is the provision of an improved refrigeration system for household refrigerators including an improved evaporator which is adapted to be manufactured more economically, and which is adapted to cool the above freezing storage space uniformly, while providing a maximum amount of open space for food products, as well as a limited space or compartment that is maintained at below freezing temperatures for freezing ice cubes.

Another object of the invention is the provision of an improved evaporator of the roll-forged type which occupies a minimum amount of space in the cabinet and is also provided with a small below freezing chamber for ice cubes, and which is provided with an auxiliary header for receiving an adequate supply of refrigerant by means of which the system is assured of quick cooling action as soon as the compressor starts its cycle of operation.

Another object of the invention is the provision of an improved construction for the evaporator, having a freezing compartment, and provided with a meat pan located adjacent to the small freezing evaporator and provided with a drain tray, which also serves as a meat pan cover, and with a plurality of improved forms of shelves, drawers, and other compartments, meeting the need for storing all kinds of food at proper temperatures.

Other objects and advantages of the invention will be apparent from the following description and the accompanying drawings, in which similar characters of reference indicate similar parts throughout the several views.

Referring to the drawings, of which there are twelve sheets,

Fig. 1 is a front elevational view of the refrigerator cabinet, shown with the door open;

Fig. 2 is a front elevational view on a larger scale, showing the contents of the liner;

Figs. 3 and 4 combined are a developed plan view of the evaporator with the auxiliary header omitted;

Figure 5:
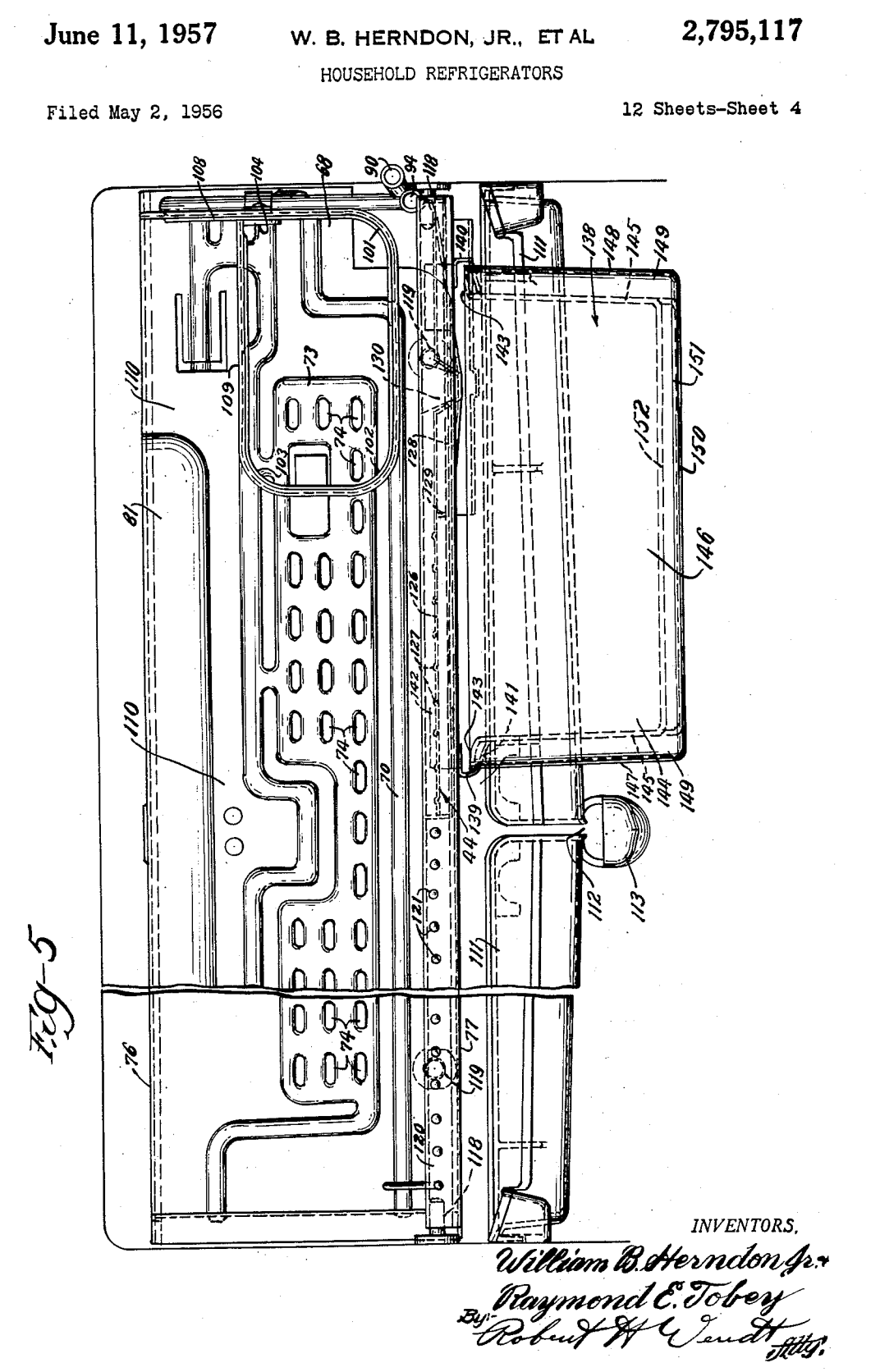

Fig. 5 is a front elevational view of the evaporator and associated structure;

Fig. 6 is a rear elevational view of the evaporator;

Fig. 7 is a side elevational view of the evaporator taken from the right side of Fig. 5;

Fig. 8 is a top plan view of the evaporator;

Fig. 9 is a fragmentary sectional view, taken through the evaporator on the plane of the line 9—9 of Fig. 6;

Fig. 10 is a fragmentary sectional view, taken on the plane of the line 10—10 of Fig. 3 before the tubes are joined;

Fig. 11 is a fragmentary sectional view, taken on the plane of the line 10—10 of Fig. 6, after the joint has been accomplished between the outlet from the roll-forged evaporator to the auxiliary header;

Fig. 12 is a fragmentary sectional view, taken on the plane of the line 12—12 of Fig. 11, looking in the direction of the arrows;

Fig. 13 is a top plan view of the uppermost shelf and drip tray;

Fig. 14 is a fragmentary side elevational view, in partial section, of the contents at the top of the liner, taken from the right of Fig. 5;

Fig. 15 is a fragmentary sectional view, showing those portions of the cabinet content which are below the meat pan;

Fig. 16 is a fragmentary side elevational view in partial section, showing the crisper pans, which are located at the bottom of the cabinet;

Fig. 17 is a fragmentary sectional view taken on the plane of the line 17—17 of Fig. 8, looking in the direction of the arrows;

Fig. 18 is a fragmentary sectional view taken on the plane of the line 18—18 of Fig. 8, looking in the direction of the arrows;

Fig. 19 is a fragmentary sectional view taken on the plane of the line 19—19 of Fig. 6, looking in the direction of the arrows;

Fig. 20 is a fragmentary top plan view of the front end of the freezer chamber equipped with an evaporator door.

Figs. 21 and 22 combined are a developed plan view of a modified form of evaporator with integral types of headers between the sheets.

Referring to Figs. 1 and 2, the household refrigerator embodying the invention includes a cabinet 20 provided with an outer shell 21, the side walls 22, 23, which may be integrally joined to the top wall 24 and provided with a front facing flange 25 for engagement with the door seal.

The cabinet is closed at the bottom by a bottom panel 26, forming part of the shell, and provided with foot pads 27 supporting the bottom panel above the floor. The shell supports an inner liner 28, having side walls 29, 30, bottom wall 31, top wall 32, and rear wall 33; and the liner is insulated from the outer shell by means of the usual liner supports and a layer of insulation between the shell and liner on all sides.

Breaker strips 34, 35, 36, 37 close the gap between the liner and shell at the front, covering the insulation and providing a finished appearance.

The refrigerator is provided with an insulated door 38, comprising an outer shell 39 and an inner panel 40 secured together at their edges and provided with the usual door seal 41. The inner panel may be suitably formed to provide shelves 42 (Fig. 16); and the door has insulation between its outer shell and inner panel.

The present household refrigerator preferably has its evaporator 43 located at the top, where it is also provided with an upper shelf assembly 44; and the liner walls support a plurality of additional shelf assemblies 45, 46, 47 spaced from each other and located above the crisper drawer 48 and its adjacent shelf 49.

There is an additional vegetable cooler drawer 50 located in the bottom of the liner; and all of these parts are shown in greater detail in the other views.

The evaporator 43 is preferably of the roll-forged type in which two sheets of aluminum are integrally welded together to form a single sheet which has a plurality of passages and spaced walls forming conduits of larger volume, and having the walls integrally joined together at a multiplicity of spaced points for supporting them in definite spaced relation.

Such an evaporator is shown in developed plan in Figs. 3 and 4. The evaporator sheet is indicated in its entirety in 51; and the two sheets of which it is formed are spaced from each other to form the inlet conduit 52, which extends to the right in Fig. 3 along the top edge 53 and forwardly at 54 on the side wall, where it is provided with a plurality of passes 55—61 joined at their ends by the U-shaped formations 62—63 on the side wall of the evaporator and joined by U-shaped formations 64 at points on the pattern, which later become the top of the freezing compartment.

From the sinuous conduits 54—61 that extend about the freezing chamber 68 (Fig. 1) the conduits between sheets of the roll-forged evaporator 43 extend backwardly at 69 and transversely at 70 along the lower edge 77 of the evaporator to the lower part 72 of a larger volume space 73 located between sheets, except at a multiplicity of regularly spaced portions 74, which are integrally joined together during the roll-forging process.

The larger volume space 73 in the evaporator conduits is in the nature of a header and also in the nature of parallel conduits extending from the conduits 72 along the bottom of the evaporator to the upper conduit 75.

This gives the evaporator a sinuous series circuit leading to a multiplicity of parallel conduits at 73, which permit the fuller expansion and vaporization of the refrigerant as it progresses through the evaporator.

The evaporator sheet 51 is preferably provided with a backwardly turned U-shaped formation along its forward ends and its upper and lower edges, as indicated at 76, 77, to eliminate the sharp edge of the metal plate at those points; and the evaporator is bent at right angles along the dot-dash lines 78, 79 (Fig. 3) so that it may be located adjacent the side walls 29 and 30 of the liner and adjacent the rear wall 33 from which it is spaced by spacers and studs that are secured to the liner wall, passing through apertures 80, shown in Figs. 3 and 4.

Along its top edge the evaporator sheet 51 is provided with one quarter cylindrical pressed formation 81 (Fig. 7), which is long enough to receive the tubular header 82 of larger aluminum tubing provided with tubular end portions 83, 84, serving as inlet and outlet, and formed by spinning down the larger tube at 85 and 86.

The inlet to the evaporator is at the conduit 52, where an aperture 87 is made in the roll-forged sheet, the parts of which are spread apart at the walls 88 of conduit 52 and joined, by means of an internal metal sleeve 89, to a metal tube 90 also located on the sleeve in abutting relation with the end of conduit 52, the parts being brazed or welded together, as shown in Figs. 10–12.

The sleeve 89 emerges from an oval form into a cylindrical tubing at 90; and the tube 90 is the inlet for the entire evaporator.

A similar joint is made between the conduit 91 and the cylindrical tubing 92 at the aperture 93, which is the outlet from the roll-forged portion of the evaporator; and the tube 92 leads transversely of the top of the evaporator at the rear to the inlet 83 of the tubular header 82.

A suction outlet tube 94 extends into the outlet 84 of the header 82 and has its open end 95 turned upward to terminate above the level of liquid in the header 82. The tube 94 is the outlet from the evaporator leading to the suction inlet of the compressor in a refrigeration system of the type disclosed in Alsing Patent No. 2,663,999, issued December 29, 1953 (Fig. 5), which is hereby incorporated by reference thereto.

The header 82 is clamped in the recess which is formed by the pressed formation 81 (Fig. 9) by a single metal clamp 96 shaped at 97 to fit the header and at 98 to fit the tube 92, and provided with an attaching flange 99 riveted at 100 to the evaporator sheet.

The evaporator 43 has the portion which contains the passes 54—61 (Fig. 3) bent laterally at 101 (Fig. 5) with an easy bend and upwardly at 102 and backwardly at 103 until its end portion may be turned down at 104 and riveted or welded to the side wall 108 to form a freezer chamber 68 for receiving ice trays, or making ice cubes, or for storing frozen food, inside the chamber 68 or on the upper surface 109 of the freezing chamber.

The bottom of the freezing chamber 68 is provided with suitable drainage holes for draining condensation to the drainage pan 126, which also serves as a meat pan cover.

Referring to Fig. 17, this is a fragmentary sectional view, showing the attachment of the cold control bulb 220 to the evaporator 43 at the point shown in Fig. 8 on the upper left wall. The evaporator wall has a bulb supporting member 225, which is secured to the wall by rivets 224 and extends upward and outward.

It has a threaded bore for receiving the threaded screw bolt 223, which passes through the clip 221 and secures the clip to the supporting member 225, also clamping the bulb 220 in the angular portion of the clip. Thus the bulb 220 is of the compensated type, being supported in heat conducting relation with the evaporator 43, but spaced from the evaporator to be subject also to the temperature of air in the food storage compartment.

Referring to Fig. 18, this shows the attachment of the defrost bulb 226 to the evaporator 43 by means of a clip 227. The clip is drawn toward the evaporator to clamp the defrost bulb 226 by means of a threaded screw bolt 228 threaded into the clip.

The present refrigerator is defrosted every twenty-four hours by means of a clock controlled switch, which initiates the defrost and also terminates it, unless it is sooner terminated responsive to heat acting on the defrost bulb 226.

Referring to Fig. 19, this is a fragmentary sectional view, showing the mode of attachment of the heater 229, which is also shown in Fig. 6, extending across the lower part of the evaporator. Heater 229 is preferably of the type having an electric heater element or wire enclosed in refractory powder contained in an aluminum tube, serving as a sheath.

The heater, as shown in Fig. 6, is located below the grid portion 73 of the two sheet evaporator and above a lowermost pass 70 located between the sheets, and is clamped to the two sheet evaporator 43 by a clip 230 having a curved portion 232 engaging the heater. A plurality of clips 230 are employed; and each has a threaded bore for receiving a screw bolt 231, which draws the clip to the evaporator and clamps the heater to the evaporator.

A heat conducting compound is also employed at the joint between evaporator 43 and heater 229.

The freezing chamber 68 extends from front to back of the liner, terminating at the rear wall 110 of the evaporator, and may be provided at its front opening with a suitable evaporator door 65 pivoted to the walls of chamber 68 and provided with a rubber block engaging the edges of these walls.

The inner liner wall 30 carries a hinge 235 for pivotally mounting the door, which is provided with the rubber bumper block 236 adhesively attached to the inwardly extending flange 237 on the door. This provides a sufficient closure for the front of the freezing chamber to elminate air circulation over the ice trays and prevent frost build-up on the inside of the evaporator.

As the freezing chamber 68 occupies a minimum amount of space, and the evaporator itself closely hugs the side walls and rear wall, this leaves the space inside the liner with a maximum amount of open volume for receiving other food products.

The liner 28 is provided on its two side walls 29 and 30 and rear wall 33 with a molded plastic or rubber trough 111 (Fig. 14), which is mounted on retainers carried by the liner wall; and the trough 111 slopes downwardly from the front of the side walls to the rear wall, where it slopes across the rear wall from both sides to the middle. At the middle the trough is provided with a discharge aperture 112, discharging condensate into a top open tubular member 113, which extends downwardly and backwardly through liner 33 and back panel 114 of the shell, and is provided with integral grommets 115, 116 and a downwardly turned end 117; the condensate may be carried by a tube down to an evaporation pan below the bottom panel.

The uppermost shelf 44 is located immediately below the freezing chamber 68 and is shown in greater detail in Figs. 2, 5 and 14. The liner is provided with inwardly extending studs 118 (Fig. 5) secured to the liner by any suitable fastening means; and similar studs are located at 119 on the rear wall 33 of the liner at the same level.

The upper shelf 44 includes a front finish rail 120 (Fig. 14) of substantially U shape open at the bottom and adapted to hook over the two studs 118 at each of the ends of this rail. The U-shaped front rail 120 has its rear flange secured to a multiplicity of stiff, straight wires 121 (Fig. 13), the wires being upset on both sides of the rear flange 122 of rail 120 to be rigidly secured thereto in apertures; and the wires are also riveted to a rear rail 123, which is provided with apertured stirrups 124 for receiving the rear studs 119 supporting this shelf.

The wires 121 may be joined below their middle portions by a transverse wire brace 125, which is welded to each of the wires 121; and the wire part of the shelf extends over substantially half of the horizontal projected area of the liner to the sheet metal shelf portion 126. This sheet metal shelf portion 126 has a plurality of pressed ribs 127 extending from front to back; and the sheet metal shelf portion 126 slopes toward the right toward a portion 128 that is located below the freezing chamber 68, and which begins at a downward offset 129 (Fig. 5).

The portion 128 of the sheet metal shelf 126 serves as a drip pan below the freezing chamber 68 and has a downwardly pressed formation 130 in the nature of a trough, having side walls 131, 132 which taper in depth from the front to the back; and the bottom of the area 130 tapers in width from the front to the back, where the drip pan extends backwardly to its rear edge 133, the trough being formed with a discharge opening 134, discharging into the trough 111 for condensate.

The drip pan also slopes toward the trough 130 at both of its side portions 135 and 136; and the drip pan has a depending integral border flange 137 on all of its sides, these flanges 137 being secured by rivets to the front rail 120 and to the rear rail 123.

The ribbed portion 126 of the sheet metal shelf serves primarily as a cover for a meat pan 138 (Fig. 5).

For support of the meat pan the shelf 44 has secured to its front and rear rails a pair of guides 139 and 140, these guides comprising inwardly open channels with downwardly sloping lower flanges 141 and upwardly extending attaching flanges 142 at each end riveted or welded to the front rail 120 and rear rail 123. The guides form oppositely open U shaped members with tapered openings for engagement with the outwardly turned guide flanges 143 carried by the meat pan.

The meat pan may comprise a sheet metal or molded plastic member provided with a front portion 144 that is wider than the rear portion 145 so that the front portion has a front wall 146 wide enough to extend beyond the inner edges of the guides 139 and 140. The side walls 147 and 148 of the front portion extend backwardly a short distance, where they engage inwardly extending walls 149 leading to the side walls 145 of the narrower part of the meat pan.

The side walls 145 of the narrower part of the meat pan extend backwardly over the major portion of the walls of the meat pan and are integrally joined to a rear wall.

At its front the meat pan may have its bottom wall at 150 and may have an upwardly extending portion 151 leading to a rear bottom wall portion 152. The meat pan is open at the top, but is closed by a sheet metal part of the shelf 44; and the meat pan is spaced from the trough 111 on all sides for circulation of air about the pan. The meat pan is quite close to the freezing chamber 68 in order to maintain near freezing temperatures.

By virtue of the meat pan having a wider rectangular portion at the front, this wider portion engages the front ends of the guides 140 and acts as a stop, limiting the inward motion of the meat pan on its guides.

Referring to Figs. 2 and 15, these are views which show the other contents of the liner and alternative forms of drawers mounted on molded plastic guides. The shelves have been indicated at 45—47; and for their support the liner walls 29 and 30 are each provided with the molded plastic guides 153 (Fig. 15).

These guides have apertures for receiving the screw bolts 154 by means of which they are secured to the liner wall; and each guide has an inwardly extending guide flange 155 for slidably supporting a shelf or drawer. Each guide has a front roller 156 mounted so that it is exposed at its upper edge for engagement with the guide flange 157 on a shelf, such as the shelf 46.

The guide 153 has an upwardly projecting shoulder at 158 in its guide flange 155 for the purpose of engaging the abrupt forward shoulder 159 on a nylon slider block 160, which is carried by shelf 46, and which has a beveled rear edge 161. The block 160 is located forwardly on the shelf so that it engages stop 158 before the end 162 of the shelf guide flange 157 clears the upward offset 163 on guide 153.

Guide 153 has an upper inwardly projecting guide flange 164 extending parallel to the lower flange 155 so that they may receive between them the guide flange 157 of the shelf.

The upward offset at 163 extends to a higher portion 165 of the upper guide flange 164, leaving space during which the block 160 can clear the higher guide surface 166.

Each shelf has a front rail 167 of substantially U shape and chromium plated; and the front rail has a multiplicity of front-to-back stiff wires 168 upset and riveted at 169 in the rear flange of the front rail. Each of the wires 168 is also upset and riveted at 170 in a rear rail 171, which is welded to a channeled member 172, forming the side wall of the shelf frame, and provided with an upper flange 173 projecting outwardly to serve as a handle.

The shelf is removed by sliding it out on its roller 156 until stop 160 engages stop 158, after which the front end of the shelf is lifted to cause stop 159 to clear 158; and the shelf may be entirely removed and used as a tray for serving food or the like.

Referring to the top of Fig. 15, this is a bottle pan 174, having its front 175, bottom 176, and rear wall 177 formed of one integral piece with side flanges 178, 179, and 180 overlapping and welded to a side wall 181. The bottle pan 174 has the same front rail 182 welded to its front wall; and the side walls 181 have outwardly projecting flanges 183 provided with blocks 184 for reception in the space between the guide flanges 164 and 155.

Thus the bottle pan 174 is mounted on the same type of guides for sliding and rolling movement in the same manner.

Referring to Figs. 2 and 15, the shelf 45 is shown with the bottle pan 174 at the left and with the rest of the shelf made of front and rear rails joined by the stiff wires 168.

Referring to Figs. 2 and 16, 48 indicates a crisper pan of half the width of the cabinet, which may comprise a stamped sheet metal member with outwardly projecting border flange 185 for engagement above a guide flange 186 on each side.

The crisper pan 48 has a front finish rail 187 (Fig. 16) which has inwardly turned flanges 188 and 189 secured to the front of the drawer and serving as a handle.

A vertical post 190 has a rubber foot 191 resting on the glass or plastic cover plate 192 for the vegetable drawer 50; and post 190 supports one side of a frame comprising a channeled member 193, front and rear members 194, 195, and a side frame member 196.

The frame, comprising 193—196, is adapted to support a glass cover 197 for closing the top of the crisper 48, which is slidably mounted on horizontal flanges of the frame members 193, 196. Rear frame member 195 is mounted upon a stud 198; and an open shelf 49 is provided with front and rear rails 199 and side frame members 200, which are apertured to be supported on side studs 202.

The vegetable pan 50 may consist of a stamped sheet metal or molded rectangular container having outwardly projecting side flanges 203 at the top for resting on guides formed by the inwardly projecting flanges 204 and 205 of a channeled member 206, which is mounted on angle brackets 207 secured to the side walls of the liner.

The upper flange 204 of channel 206 supports a glass or plastic cover plate 192. The bottom of the liner slopes inwardly at 208 to provide room for part of the motor compressor; and the extreme bottom 209 of the liner drains toward a central discharge aperture 210 leading to a condensate drain pan.

Referring to Figs. 21 and 22, these are views which combined show the plan of a modified form of evaporator in which the receiver is integrally incorporated between the sheets of the roll forged evaporator.

In this modified evaporator the inlet is indicated at 240 where the roll forged evaporator has its two sheets separated at a cut-out 241, so that a tube may communicate with the conduit 242 extending between the sheets toward the right.

This conduit then extends downwardly at 243 and makes vertical passes 244—250 which are joined together by U-shaped portions 251—254 at the bottom and by U-shaped formations 255—257 at the top.

While these passes are vertical in the figure, they are part of an area which is later formed into an ice cube compartment 68 of rectangular shape, wherein the passes extend laterally, upwardly, and laterally again.

The passes 243—250 are straight except for the fact that they are off-set as indicated at 258 to make space for the apertures 259, which would otherwise be too close to the conduits.

The last pass 250 communicates with a laterally extending portion 260 which turns downward at 261 and has an elongated horizontal pass 262 which will extend across the cabinet to a manifold portion 263 of this pass, having three outlets 264—266 leading to an area 267 which is rectangular and which forms a multiplicity of horizontal and vertical conduits separated only by the long oval portions 268 which represent the portions of the sheets that are secured together.

The area 267 has three outlets 269—271 leading to a manifold portion 272 which extends toward the right in conduit 273 and downward in conduit 274. Conduit 274 leads to a plurality of enlargements or headers 275—279 in succession, serving as integral headers formed between the two sheets and joined by conduit portions 280—283, as shown. The last header 279 leads to the suction outlet 284.

These headers all include tapered portions at their ends and the conduits are displaced when required to space them from the apertures 285 which are used for mounting the evaporator on studs in the liner.

The course of the refrigerant is as follows:

The refrigerant enters from the capillary tube at 240 and goes through the passes 243—250 in series. Then the refrigerant goes through the horizontal pass 262 to the manifold 263 which distributes it upwardly through the vertical and horizontal conduits in the area 267. This portion of the evaporator will be on the left wall of the liner.

From the conduit area 267 the refrigerant passes upward through outlets 269—271 into the manifold portion 272 which extends through conduit 273 to elongated header 275.

From elongated header 275 it passes through conduit 280 to a short header 276 and through off-set conduit 281 to a short header 277. Then upward through conduit 282, through a short header 278, off-set conduit 283 and through a short header 279 to a suction outlet 284. The short headers are used to provide spacing between the conduits and the aperture 285.

The relative areas of the conduits are shown in the vertical views and the total cross sectional area of the refrigerant conduits in parallel increases from the capillary inlet to the suction outlet.

It will thus be observed that we have invented an improved household refrigerator in which there is a maximum amount of space for storage of food at above freezing temperatures, while still providing a small ice cube freezing chamber.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes.

2. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator having the base of its L-shaped formation provided with a multiplicity of passes joined by U-shaped formations at the ends thereof to form a sinuous conduit extending substantially about all of the four sides of said freezing chamber.

3. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator having the base of its L-shaped formation provided with a multiplicity of passes joined by U-shaped formations at the ends thereof to form a sinuous conduit extending substantially about all of the four sides of said freezing chamber, the said evaporator also having a multiplicity of parallel conduits for refrigerant formed between the two sheets thereof, which are joined together at a multiplicity of regularly spaced points, leaving the said parallel conduits joined by vertically extending conduits.

4. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator having the base of its L-shaped formation provided with a multiplicity of passes joined by U-shaped formations at the ends thereof to form a sinuous conduit extending substantially about all of the four sides of said freezing chamber, the said evaporator also having a multiplicity of parallel conduits for refrigerant formed between the two sheets thereof, which are joined together at a multiplicity of regularly spaced points, leaving the said parallel conduits joined by vertically extending conduits, the refrigerant being first directed into the sinuous passes of said freezing chamber and thereafter passing into the multiple parallel passes of the remainder of the evaporator, which is located on the side walls of the liner.

5. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator having the base of its L-shaped formation provided with a multiplicity of passes joined by U-shaped formations at the ends thereof to form a sinuous conduit extending substantially about all of the four sides of said freezing chamber, the said evaporator also having a multiplicity of parallel conduits for refrigerant formed between the two sheets thereof, which are joined together at a multiplicity of regularly spaced points, leaving the said parallel conduits joined by vertically extending conduits, the refrigerant being first directed into the sinuous passes of said freezing chamber and thereafter passing into the multiple parallel passes of the remainder of the evaporator, which is located on the side walls of the liner, said evaporator being provided along the upper rear wall of the evaporator with a stamped formation of partially cylindrical form for receiving an elongated receiver of larger diameter, and the refrigerant passing from said parallel passes to said receiver, and thence out of the receiver through a suction pipe.

6. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the linear and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall.

7. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall, and an upper shelf comprising a pair of front and rear frame members carrying a multiplicity of wires extending from one frame member to the other and located over substantially half of the area encompassed by the evaporator in the liner, the other half of said area being substantially closed by a sheet metal air baffle and drip tray carried by said frame members, and provided with a slope toward an intermediate portion and toward the back of said baffle to collect and conduct condensate to a discharge point at the rear.

8. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall, and an upper shelf comprising a pair of front and rear frame members carrying a multiplicity of wires extending from one frame member to the other and located over substantially half of the area encompassed by the evaporator in the liner, the other half of said area being substantially closed by a sheet metal air baffle and drip tray carried by said frame members, and provided with a slope toward an intermediate portion and toward the back of said baffle to collect and conduct condensate to a discharge point at the rear, the said liner supporting a molded plastic trough assembly extending backwardly on both side walls and transversely across the rear wall underneath the lower edges of the evaporator on said walls and having a depending discharge conduit.

9. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall, and an upper shelf comprising a pair of front and rear frame members carrying a multiplicity of wires extending from one frame member to the other and located over substantially half of the area encompassed by the evaporator in the liner, the other half of said area being substantially closed by a sheet metal air baffle and drip tray carried by said frame members, and provided with a slope toward an intermediate portion and toward the back of said baffle to collect and conduct condensate to a discharge point at the rear, the said frame members being provided beneath said drip pan and air baffle with a pair of inwardly open channeled members secured to said frame members at each end and providing guides for a drawer and a meat drawer having guide flanges extending outwardly and mounted for sliding movement in said guides.

10. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall, and an upper shelf comprising a pair of front and rear frame members carrying a multiplicity of wires extending from one frame member to the other and located over substantially half of the area encompassed by the evaporator in the liner, the other half of said area being substantially closed by a sheet metal air baffle and drip tray carried by said frame members, and provided with a slope toward an intermediate portion and toward the back of said baffle to collect and conduct condensate to a discharge point at the rear, the said frame members being provided beneath said drip pan and air baffle with a pair of inwardly open channeled members secured to said frame members at each end and providing guides for a drawer and a meat drawer having guide flanges extending outwardly and mounted for sliding movement in said guides, the said guides terminating short of the front of said liner, and the said meat drawer having a narrow transverse portion which is wider transversely than the spaces between the guides and wider than that portion of the drawer which has its guide flanges located in the guides.

11. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall, and an upper shelf comprising a pair of front and rear frame members carrying a multiplicity of wires extending from one frame member to the other and located over substantially half of the area encompassed by the evaporator in the liner, the other half of said area being substantially closed by a sheet metal air baffle and drip tray carried by said frame members, and provided with a slope toward an intermediate portion and toward the back of said baffle to collect and conduct condensate to a discharge point at the rear, the said frame members being provided beneath said drip pan and air baffle with a pair of inwardly open channeled members secured to said frame members at each end and providing guides for a drawer and a meat drawer having guide flanges extending outwardly and mounted for sliding movement in said guides, the said guides terminating short of the front of said liner, and the said meat drawer having a narrow transverse portion which is wider transversely than the spaces between the guides and wider than that portion of the drawer which has its guide flanges located in the guides, the said narrower portion of the meat drawer striking the front ends of the guides and serving as a stop for determining the limit of inward movement of the meat drawer.

12. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall, and an upper shelf comprising a pair of front and rear frame members carrying a multiplicity of wires extending from one frame member to the other and located over substantially half of the area encompassed by the evaporator in the liner, the other half of said area being substantially closed by a sheet metal air baffle and drip tray carried by said frame members, and provided with a slope toward an intermediate portion and toward the back of said baffle to collect and conduct condensate to a discharge point at the rear, the said liner being provided on its side walls with a plurality of aligned molded guides, each of said guides having an inwardly open guide channel molded therein with upper and lower guide flanges, and a removable shelf carried by each pair of guides, the said shelf having outwardly projecting guide flanges receivable in said guides on each side, and each shelf being provided with an intermediate lower slider block toward the rear, and rolling on a front roller carried by each guide at the front.

13. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped in pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said evaporator being supported on the walls of said liner by being provided with apertures receiving a plurality of inwardly projecting studs carried by the liner wall, and an upper shelf comprising a pair of front and rear frame members carrying a multiplicity of wires extending from one frame member to the other and located over substantially half of the area encompassed by the evaporator in the liner, the other half of said area being substantially closed by a sheet metal air baffle and drip tray carried by said frame members, and provided with a slope toward an intermediate portion and toward the back of said baffle to collect and conduct condensate to a discharge point at the rear, the said liner being provided on its side walls with a plurality of aligned molded guides, each of said guides having an inwardly open guide channel molded therein with upper and lower guide flanges, and a removable shelf carried by each pair of guides, the said shelf having outwardly projecting guide flanges receivable in said guides on each side, and each shelf being provided with an intermediate lower slider block toward the rear, and rolling on a front roller carried by each guide at the front, the said lower flange of each guide having an upwardly extending stop portion adjacent the roller for engaging the block, and the upper flange of each guide having an upper clearance with respect to the lower flange for permitting the block to clear said roller during removal of the shelf.

14. In a household refrigerator, the combination of an insulated cabinet having an outer shell, an inner liner, and insulation between the liner and shell, said liner and shell being open at their front ends and having a breaker strip assembly enclosing the space between the edges of the liner and shell about the door opening, an insulated door having a seal for closing said cabinet, and an evaporator in the upper part of said cabinet for cooling the food storage space in said cabinet and providing a freezer chamber for ice cubes, comprising a sheet metal member formed of a pair of sheets roll-forged together, the said sheets being substantially L-shaped on pattern and having conduits between said sheets, the evaporator extending backwardly on the left wall of the liner transversely across the rear wall of the liner and forwardly on the right wall of the liner, and having the base of said L pattern bent upwardly and inwardly and secured to that portion of the evaporator extending forwardly on the right wall to form a chamber for freezing ice cubes, the said liner walls supporting an upper shelf which is open over substantially half the vertical projected area of the liner and closed by an air baffle and drip pan in the other half of said area, a meat pan slidably mounted below said drip pan on said shelf, a second open shelf located below said meat pan, and having a bottle pan depending therefrom at the side opposite to the meat pan, a third open shelf beneath the second for supporting food for storage at an intermediate temperature, a fourth open shelf below the third and extending over half the area of the box, a crisper slidably mounted in guides and provided with a cover and located in the other half opposite said fourth shelf, and a cold storage drawer for vegetables located lowermost in the bottom of said liner.

References Cited in the file of this patent
UNITED STATES PATENTS

| | | |
|---|---|---|
| 2,413,233 | Johnson | Dec. 24, 1946 |
| 2,698,521 | Mann | Jan. 4, 1955 |
| 2,730,868 | Philipp | Jan. 17, 1956 |